Patented Sept. 6, 1949

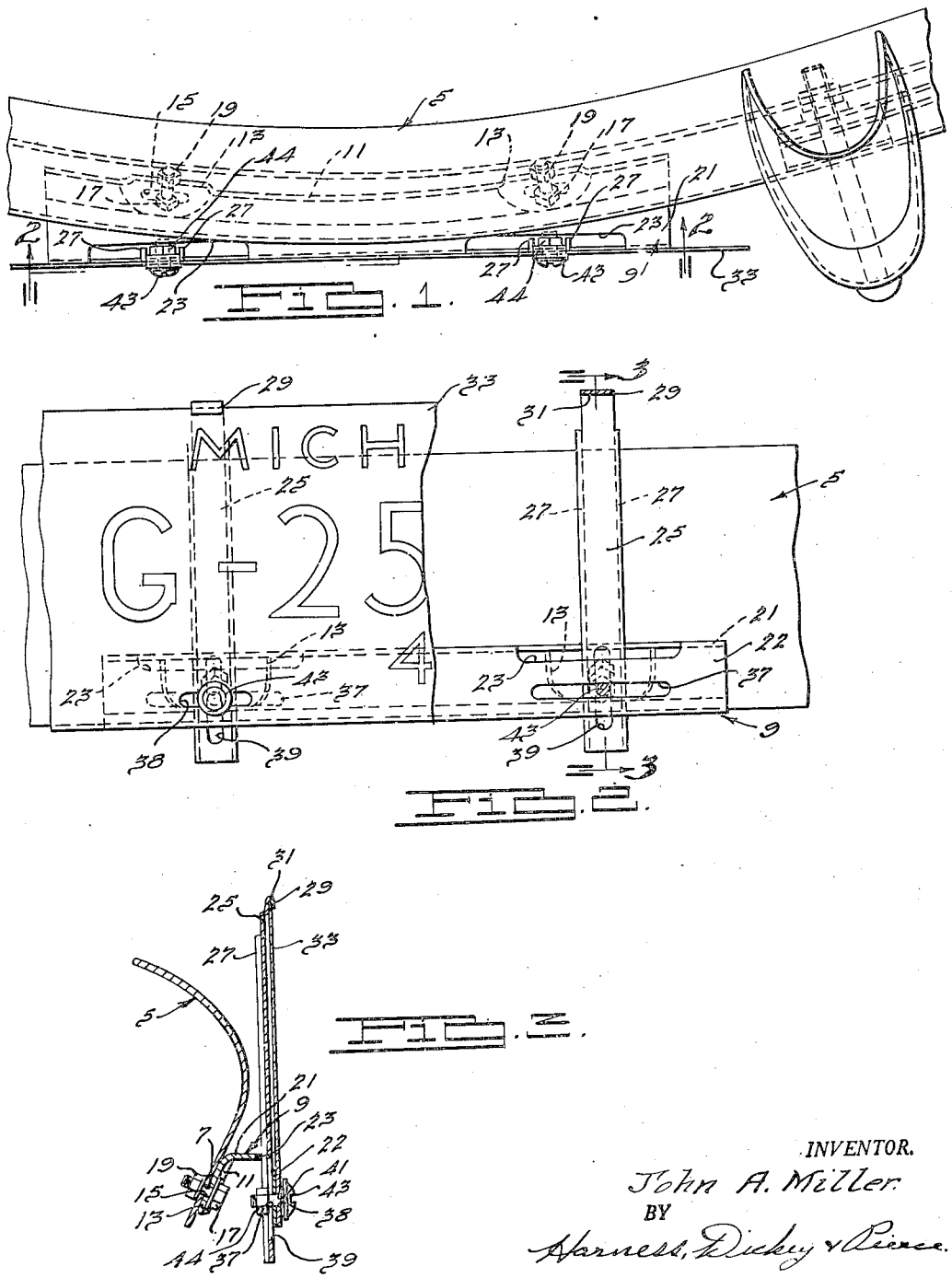

2,481,437

UNITED STATES PATENT OFFICE 2,481,437

LICENSE PLATE HOLDER

John A. Miller, Detroit, Mich., assignor to Kaiser-Frazer Corporation, Willow Run, Mich., a corporation of Nevada Application September 5, 1947, Serial No. 772,353

4 Claims. (Cl. 248—201)

This invention relates to improvements in vehicle license plate holders.

The principal objects of this invention are to provide an improved vehicle license plate holder which can be adjustably connected to a vehicle bumper and which is itself adjustable for accommodating various sizes and types of license plates; to provide an improved license plate holder of the aforementioned type which is adapted to be connected to the underside of a generally inverted C-sectioned bumper which extends arcuately across the front end of a vehicle, so as to retain the license plate in a generally vertical plane; to provide a license plate holder which may be easily mounted on a vehicle bumper and which will retain a license plate in a more positive manner; to provide a license plate holder of the aforementioned type which is attractive in appearance and especially easy to connect a license plate thereto.

These and other objects of this invention will become apparent from the following detailed description taken in conjunction with the accompanying drawing in which:

Figure 1 is a top plan view of the license plate holder of this invention mounted on a vehicle bumper;

Fig. 2 is a view partially in elevation and partially in section taken along the line 2—2 of Fig. 1; and Fig. 3 is a sectional view of the structure illustrated in Fig. 2 taken along the line 3—3 thereof.

Referring to the drawing, a vehicle bumper 5 is conventionally mounted on one end of a vehicle (not shown). The bumper 5 is, as shown in Fig. 3, of a generally inverted C-shape in cross section and extends arcuately across the end of the vehicle to which it is attached. The license plate holder of this invention is adapted to be connected to the underside of the bumper 5 and for this purpose the underside of the bumper 5 is provided wih a pair of longitudinally spaced apertures 7.

The license plate holder comprises a bracket, generally indicated at 9, which, as shown in Fig. 3, is of a generally inverted U-shape. The inner leg 11 of the bracket 9 is longitudinally bowed or curved so as to be complemental in shape to the bumper 5 and follow the contour of the latter throughout its length. The bracket leg 11 is formed with a pair of offset portions 13, adjacent each end thereof, which are adapted to abut the outer face of the bumper.

Each offset portion 13 of the bracket leg 11 is provided with a horizontally elongated slot 15, through which the shank of a bolt 17 extends so as to carry a nut 19 for adjustably connecting the bracket 9 to the underside of the bumper 5. It will be noted that the inner leg 11 of the bracket 9 extends angularly with respect to the bracket upper horizontal leg 21 so that the outer leg 22 of the bracket will be disposed in a generally vertical plane when the inner leg is connected to the arcuate face of the bumper 5.

The bracket 9 is provided with a pair of longitudinally spaced, horizontally elongated slots 23, at the junction of the horizontal leg 21 and the outer vertical leg 22. A pair of license plate retainer elements 25 are slidably received in each of the slots 23, with the lower end of each of the elements projecting downwardly through a slot 23, and the upper end projecting thereabove. The retaining elements 25 are illustrated as being of a sheet metal construction and having inturned vertical side flanges 27, for strengthening purpose. The upper end of each of the retaining elements 25 is reversely bent at 29 to define a pocket 31 in which is received and retained the upper end of a conventional vehicle license plate 33. The lower end of each retaining element 25 abuts against the inner face of the outer bracket leg 22 so that each element 25 is disposed in a generally vertical plane, and therefore will retain the license plate 33 in a vertical plane.

The bracket leg 22, adjacent the lower end thereof, is provided at each end with a horizontally elongated slot 37, each of which is adapted to register with a conventional license plate elongated slot 38, adjacent the lower edge of the license plate. A vertically elongated slot 39 is provided adjacent the lower end of each of the license plate retaining elements 25. Each of the retaining element slots 39 is adapted to register with one of the horizontally elongated slots 37 of the bracket 9 and one of the license plate slots 38. The shank of a cap screw 43 is inserted through each of the license plate slots 38, the vertically elongated retaining element slots 39, and the bracket slots 37. A nut 44 is carried on the thread shank of each cap screw 43 for securing the lower portion of the license plate, and the lower end of each of the retaining elements 25, to the bracket leg 22. In this way the license plate and retaining elements can be easily secured to the bracket 9 and any necessary adjustments, due to variations in the location of the slots 38 in various types of license plates can be compensated for, in order to make the attachment of the license plate as easy as possible.

It will thus be seen that a simple and efficient license plate holder is provided which can be easily attached to a bumper, and to which a license plate may be easily attached, due to the plurality of adjustments which can be obtained for the various elements of the license plate holder. Likewise, the license plate holder is attractive in appearance and will rigidly retain the license plate in a vertical plane and against rattling when the vehicle is moving.

Formal changes may be made in the embodiment of the invention described without departing from the invention, the scope of which is commensurate with the appended claims.

I claim:

1. A vehicle license plate holder including a bracket having an outer substantially vertical portion, an intermediate portion joined to said outer portion at an angle thereto and an inner portion joined to said intermediate portion at an angle thereto, said inner portion being adapted to be connected to a vehicle bumper, said bracket intermediate portion having a pair of spaced slots formed therein adjacent its juncture with said outer bracket portion, a license plate retainer element slidably received in each of said bracket slots so as to be disposed in a generally vertical plane, means on the upper end of each of said retainer elements for engaging and retaining the upper portion of the license plate, and means for securing the lower portion of the license plate and the lower portion of each of said retaining elements to said outer bracket portion.

2. A vehicle license plate holder including a bracket having an outer substantially vertical portion, an intermediate portion joined to said outer portion and extending at an angle thereto and an inner portion joined to said intermediate portion at an angle thereto, said inner bracket portion having spaced elongated slots therein to permit said bracket to be adjustably connected to a vehicle bumper, said intermediate bracket portion having a pair of spaced slots therein at its juncture with said outer bracket portion, a license plate retainer element slidably received in each of said intermediate bracket portion slots so as to be disposed in a generally vertical plane, means on the upper end of each of said retainer elements for engaging and retaining the upper portion of a vehicle license plate having spaced slots adjacent the lower edge thereof, said outer bracket portion having a pair of spaced horizontal slots therein adapted to register with the lower slots of the license plate, each of said license plate retainer elements having a vertically elongated slot therein adapted to register with said outer bracket portion horizontal slots, and bolt means adapted to extend through each of said license plate slots, said retainer element slots and said bracket elongated slots for adjustably securing the lower portion of the license plate and each of said retainer elements to said outer bracket portion.

3. A vehicle license plate holder including a bracket having an inner substantially vertical portion, an intermediate portion joined to said inner portion at an angle thereto and an outer portion joined to said intermediate portion at an angle thereto, said inner bracket portion having elongated spaced slots therein to permit attachment thereof to a vehicle bumper, said intermediate bracket portion having a pair of spaced elongated slots therein at substantially its juncture with said outer bracket portion, a license plate retainer element slidably received in each of said intermediate bracket portion slots so as to be disposed in a generally vertical plane, the upper end of each of said retainer elements being reversely bent to define a groove in which the upper portion of a vehicle license plate is adapted to fit and be retained, said outer bracket portion having a pair of spaced horizontally elongated slots therein adapted to register with the conventional spaced slots adjacent the lower edge of the license plate, each of said retainer elements having a vertically elongated slot therein adapted to register with one of said outer bracket portion slots, and bolt means adapted to extend through each of said license plate slots, said retainer element slots and each of said outer bracket portion slots whereby to adjustably secure the lower portion of the license plate and each of said retainer elements to said bracket outer portion.

4. A vehicle license plate holder including a bracket having an outer substantially vertical portion, a horizontal portion joined to said outer portion, and an inner portion joined to said horizontal portion at an angle thereto, said inner bracket portion having spaced elongated slots therein to permit said bracket to be adjustably connected to a vehicle bumper, said bracket horizontal portion having a pair of spaced elongated slots at its juncture with said outer bracket portion, a license plate retainer element slidably received in each of said horizontal bracket portion slots and abutting against the inner face of said outer bracket portion so as to be disposed in a generally vertical plane, the upper end of each of said retainer elements being reversely bent to define a groove in which the upper portion of a vehicle license plate is adapted to fit and be retained, said outer bracket portion having a pair of spaced horizontally elongated slots therein adapted to register with the conventional spaced slots adjacent the lower edge of the license plate, each of said retainer elements having a vertically elongated slot therein adapted to register with one of said outer bracket portion slots, and bolt means adapted to extend through each of said license plate slots, said retainer element slots and each of said outer bracket portion slots whereby to adjustably secure the lower portion of the license plate and each of said retainer elements to said bracket outer portion.

JOHN A. MILLER.

REFERENCES CITED

The following references are of record in the file of this patent:

UNITED STATES PATENTS

| Number | Name | Date |
| --- | --- | --- |
| 1,329,206 | Pease | Jan. 27, 1920 |
| 1,815,767 | Fusmer | July 21, 1931 |
| 2,266,715 | Parrott | Dec. 16, 1941 |